June 18, 1929.  W. D. HOCKENSMITH  1,718,045
HUB FOR MINE CAR WHEELS
Filed Feb. 9, 1928
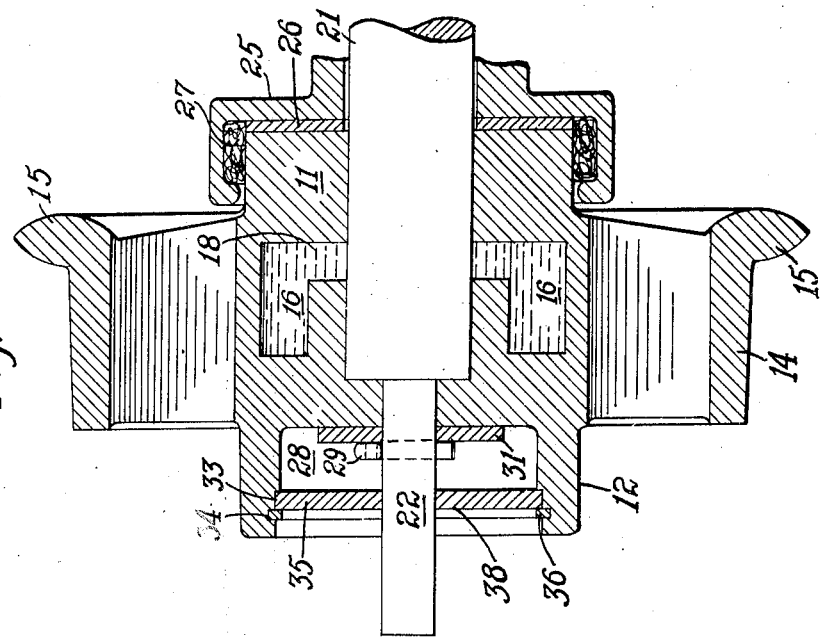
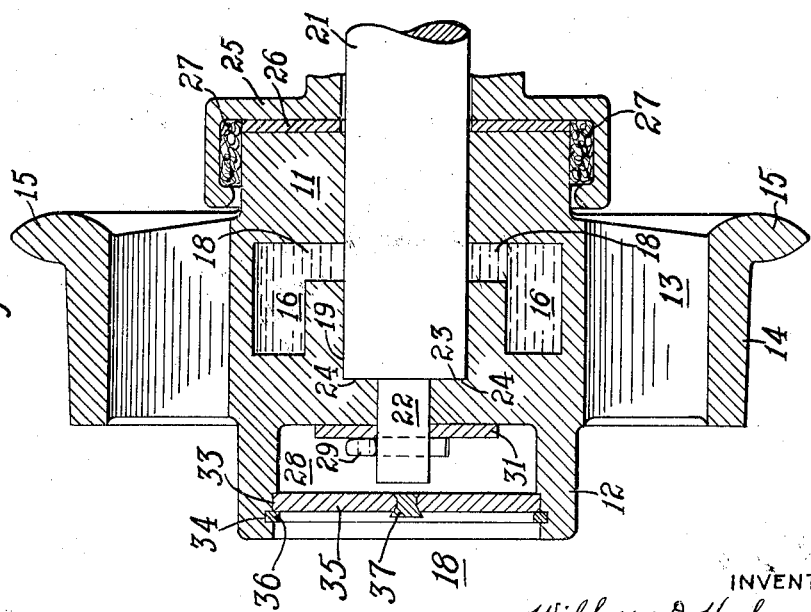
INVENTOR
Wilbur D. Hockensmith
By Green & McCallister
His Attorneys Patented June 18, 1929.

1,718,045

UNITED STATES PATENT OFFICE.

WILBUR D. HOCKENSMITH, OF IRWIN, PENNSYLVANIA, ASSIGNOR TO HOCKENSMITH WHEEL & MINE CAR COMPANY, A CORPORATION OF PENNSYLVANIA.

HUB FOR MINE-CAR WHEELS.

Application filed February 9, 1928. Serial No. 253,030.

This invention relates to car wheels and more particularly to wheels for mine cars.

An object of this invention is to provide a car wheel having an extended hub portion for cooperating with the locking means of a rotating dump for holding the car in such rotating dump.

Car wheels have heretofore been provided with extended hub portions for holding the car in a rotating dump, but all of such structures known to me are undesirable in view of the external cylindrical surface of the extended hub portion having one or more obstructions thereon, such as openings in the cylindrical hub portion for inserting or removing the cotter key that retains the wheel in place on the axle. Such openings are provided with studs having a head portion extending about the cylindrical surface or a counter sunk stud disposed in such openings. The former is undesirable in view of its interference with the rotating dump holding means, together with the fact that they are frequently knocked off in some way or other. The counter sunk studs are undesirable in view of the holding means of the rotary dump coming in contact with the outer surface of the openings and distorting it to such an extent that it is difficult to find the opening and of course renders the removal of such stud very difficult.

Another object of this invention is to provide a car wheel having an extended hub portion provided with a recess therein of sufficient diameter to remove the wheel retaining cotter key from the end of the extended hub portion.

Another object of this invention is to provide a car wheel having a counter bore for engaging and cooperating with an axle having a reduced end portion.

Another object of this invention is to provide a car wheel having the above characteristics wherein the end of the extended hub portion is provided with a novel closure for retaining oil within the recess of the extended hub portion.

Other objects will be made apparent throughout the further description of the car wheel illustrated and described in the accompanying drawings wherein, Fig. 1 is a sectional view through a car wheel embodying the invention and Fig. 2 is a similar view to Fig. 1 showing a slightly different embodiment of the invention.

The car wheel comprises in general a hub 11 having an extended reduced portion 12, the usual spokes 13 and tread 14. The tread 14 being provided with the conventional flange 15.

The hub 11 is provided with oil chambers 16 having port holes 18 and a counter bore 19 therethrough for receiving and cooperating with an axle 21 having a reduced end portion 22. The reduced portion 22 of the axle forms a shoulder 23 for engaging and cooperating with the shoulder 24 formed by the counter bore 19 for preventing excess sliding motion of the axle through the wheel as is the case with wheels having a straight bore.

The axle 21 is mounted in a pedestal or axle boxing 25, a steel washer 26 is disposed between the axle boxing 25 and the hub 11. The axle boxing 25 is also provided with an oil packing 27.

The hub portion 12 is provided with an internal recess 28 having a diameter sufficient to permit the removal of the cotter key 29 disposed through the end of the reduced portion 22 of the axle. A steel washer 31 is provided between the cotter pin 29 and the adjacent surface of the recess 28.

The recess 28 which is concentric with the bore 19 is provided with second and third step recesses 33 and 34. The recess 33 is adapted to receive a disk 35 for forming a lubricant chamber about the end of the wheel. The recess 34 is adapted to receive a suitable spring 36 for retaining the disk 35 in place. The disk 35 is also provided with a knob or handle 37 for removing the same.

Figure 2 is a slightly different embodiment of the invention wherein the reduced axle portion 22 is of sufficient length to extend considerably beyond the extended hub portion 12. The disk 35 being provided with a concentric opening 38 having a diameter of substantially the external diameter of the reduced portion 22.

The extended axle portion 22 provides an additional surface for holding a car in a rotating dump.

It can be seen from Figure 1 that the recess 28 forms a lubricant chamber wholly about the end of the wheel and that the recess 28 of the embodiment illustrated by Figure 2 forms a lubricant chamber wherein the lubricant may maintain a height at all times up to the opening 38 in the disk 35.

The above construction provides a wheel that is simple in structure, less expensive to manufacture and practical in operation.

It can be seen from the drawings that all of the machining necessary to form the wheel may be done with one lathe setting. This is a distinct advantage of the present wheel over any wheel of this type heretofore provided.

While I have illustrated and described but certain embodiments of this invention, it will be apparent to those skilled in the art that certain changes, modifications, substitutions, additions and omissions may be made in the car wheels without departing from the spirit and scope of the appended claims.

What I claim as new and desire to secure by Letters Patent is:

1. In a car wheel having a counter bore therethrough and an extended hub portion having a concentric recess therein for receiving and cooperating with an axle having a reduced end portion, a cotter pin disposed through the end of the said reduced axle portion for maintaining the car wheel thereon, a closure for the said recess and means for removing the said closure from the end of the extended hub portion.

2. In a car wheel having a counter bore therethrough and an extended hub portion having a concentric opening therein and cooperating with an axle having a reduced end portion, a cotter pin disposed through the end of the said reduced axle portion for maintaining the car wheel thereon, a closure for the said recess and means for removing the said closure and cotter pin from the end of the said recess.

3. In combination, an axle having a reduced end portion, of a car wheel having a counter bore for receiving the said axle and an extended hub portion having a concentric opening therein for receiving the end of the reduced portion of the said axle, a locking means disposed in the said recess and through the end of the reduced portion of the axle, the said recess being of sufficient diameter to permit the removal of the said locking means from the end of the extended hub portion.

4. A car wheel having a counter bore therethrough and an extended hub portion having a plurality of concentric recesses therein, closing means disposed in the end of the hub portion and releasably movable therefrom.

5. A car wheel having in combination a counter bore therethrough adapted to cooperate with an axle having a reduced end portion, an extending hub portion provided with a plurality of concentric recesses on its inner surface, a disk for closing the end of said hub portion and a lock spring for retaining said disk in place.

In testimony whereof, I have hereunto subscribed my name this 30th day of January, 1928.

WILBUR D. HOCKENSMITH.